(No Model.)

J. J. BIRDSONG.
COMBINED SEED PLANTER AND CULTIVATOR.

No. 272,632. Patented Feb. 20, 1883.

WITNESSES
C. Neveux
C. Sedgwick

INVENTOR:
J. J. Birdsong
BY Munn & Co
ATTORNEYS.

UNITED STATES PATENT OFFICE.

JOHN J. BIRDSONG, OF MEDINA, TENNESSEE.

COMBINED SEED-PLANTER AND CULTIVATOR.

SPECIFICATION forming part of Letters Patent No. 272,632, dated February 20, 1883.

Application filed July 28, 1882. (No model.)

*To all whom it may concern:*

Be it known that I, JOHN JORDAN BIRDSONG, of Medina, in the county of Gibson and State of Tennessee, have invented a new and useful Improvement in a Combined Seed-Planter and Cultivator, of which the following is a full, clear, and exact description.

Reference is to be had to the accompanying drawings, forming part of this specification, in which similar letters of reference indicate corresponding parts in all the figures.

Figure 1:
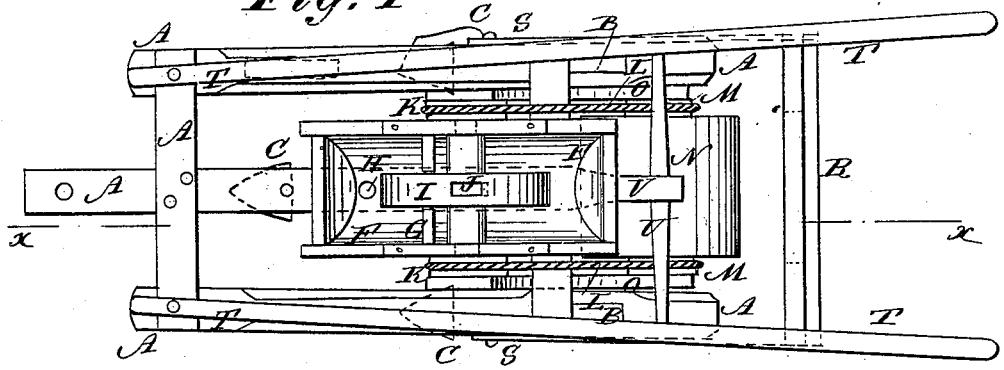
Figure 2:
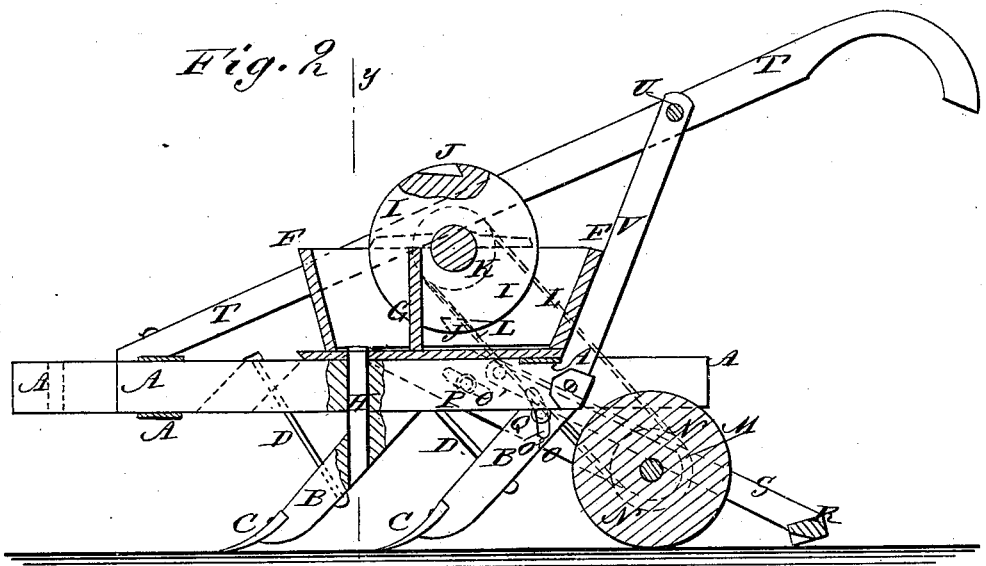
Figure 3:
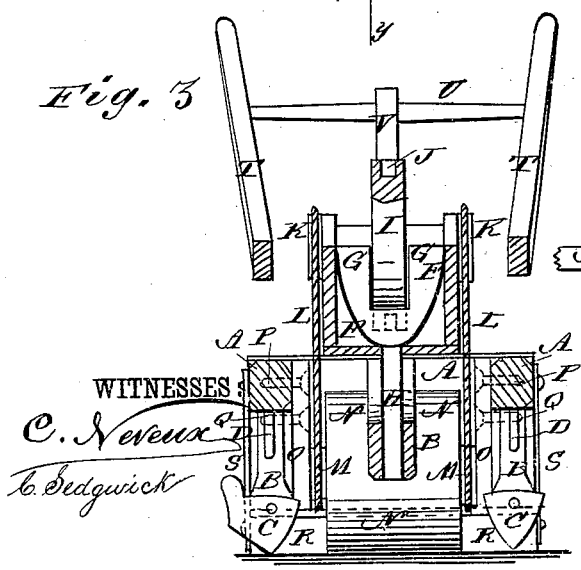
Figure 4:
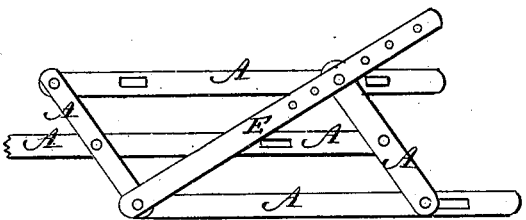

Figure 1 is a plan view of my improvement. Fig. 2 is a sectional side elevation of the same, taken through the line $xx$, Fig. 1. Fig. 3 is a sectional end elevation of the same, taken through the line $yy$, Fig. 2. Fig. 4 is a plan view of the frame, showing a diagonal adjustment.

The object of this invention is to facilitate the planting of corn and other seeds, and also to avoid the necessity of having a separate machine for cultivating the plants.

The invention consists in a combined seed-planter and cultivator constructed with a frame provided with plow-standards and plows.

To the frame is attached a seed-box, which is divided into two compartments by a slotted partition, and is provided with a discharge-tube.

To the sides of the seed-box is journaled a seed-dropping wheel, which is provided with inclined recesses to take seed from one compartment of the said seed-box and drop it into the other compartment, and which is driven from the smoothing-roller by pulleys and belts.

The smoothing-roller is connected with the frame by bars, which have slots formed in them to receive the fastening-bolts, so that the said roller can be readily adjusted to regulate the tension of the driving-belts and the depth to which the plows enter the ground.

The frame A of the machine is formed of three longitudinal bars connected by two cross-bars. The forward end of the center bar projects as shown in Fig. 1, to adapt it to serve as a draw-bar.

B are the plow-standards, the upper ends of which, or tenons formed upon their upper ends, are secured in mortises in the longitudinal bars of the frame A. To the lower ends of the standards B are attached the plows C, which may be ordinary shovel-plows or turn-plows, as the work to be done may require.

The draft-strain upon the standards B is sustained by braces D, attached to them and to the longitudinal bars of the frame A.

The standards B can be arranged with the central plow in front to open a furrow to receive seed, and the side standards B at an equal distance in its rear to bring them into proper position to cover the seed.

When the machine is to be used as a cultivator the right-hand standard B can be attached to the forward part of its frame A, as indicated by the forward mortise in Figs. 1 and 4. In this case the plows can be adjusted at a greater or less distance apart by loosening the fastening-bolts of the frame A and adjusting the said frame into a diagonal form, as shown in Fig. 4. In this case the frame A is secured in position by a diagonal bar, E, secured at the corners of the frame A by the bolts that fasten the said corners. Several holes are formed in the rear part of the diagonal bar E to receive the fastening-bolt, so that the frame A can be adjusted to bring its side bars, and consequently the plows, to any desired distance apart.

To the rear part of the frame A is attached the seed-box F, which is divided into two unequal compartments by a transverse partition, G. From the bottom of the small forward compartment of the seed-box F a tube, H, leads down through a hole in the central bar of the frame A and through a hole in the central standard B, so as to conduct the seed into the furrow opened by the central plow, close in the rear of the said plow, and before the said furrow has been partially filled by the falling in of the soil.

The partition G is slotted from its upper edge nearly to its lower edge to receive the seed-dropping wheel I, the journals of which revolve in bearings attached to or formed in the upper part of the side-boards of the seed-box F.

In the face of the wheel I are formed inclined recesses J, each being of such a size as to receive enough seed for a hill, and which, as the said wheel is revolved, take seed from the large rear compartment of the seed-box, carry it over the said wheel, and drop it into the forward compartment of the said seed-box, whence it passes through the conductor spout or tube H to the ground. With this construction the hills can be dropped at any desired distance apart by regulating the number of recesses J formed in the said wheel. To the journals of the seed-dropping wheel I are attached pulleys K, around which pass belts or chains L. The belts or chains L also pass around pulleys M, attached to the journals of the roller N, by which the soil is pressed down upon the seed and the top of the row is smoothed off. The journals of the roller N revolve in bearings in the rear ends of the bars O, the forward parts of which are secured to the frame A by the bolts P Q. The bolts P pass through longitudinal slots O' in the forward ends of the bars O, so that the said bars can have a longitudinal adjustment to regulate the tension of the belts or chains L. The bolts Q pass through curved slots $O^2$ in the bars O, so that the said bars, in addition to their longitudinal adjustment, can also have a vertical adjustment to regulate the depth to which the plows enter the ground.

When the machine is to be used for planting cotton the side standards B are detached and the roller N is made hollow and with apertures in the middle part of its shell, through which the cotton-seed escape into the furrow opened by the center plow, C. In this case the seed is covered by a covering-block, R, the ends of which are attached to the rear ends of the bars S. The forward ends of the bars S are hinged to the side bars of the frame A, so that the covering-block R can adjust itself to the surface of the ground.

T are the handles by which the machine is controlled and guided, and which are attached at their forward ends to the forward corners of the frame A. The rear parts of the handles T are attached to the ends of a round, U, the middle part of which is attached to the upper end of a standard, V. The lower end of the standard V is attached to the rear end of the central longitudinal bar of the frame A.

When the machine is to be used as a cultivator the seed-box F, the roller N, and the covering-block R and their attachments are removed, and the plow-standards B are arranged as hereinbefore described.

In using the machine as a cultivator it is drawn between the rows, with the left-hand side close to a row when the soil is to be thrown from the plants, and its right-hand side close to the row when the soil is to be thrown toward the plants.

The machine can also be used as a sweep by arranging the standards B in proper position and attaching a scraper to the said standards.

Having thus described my invention, I claim as new and desire to secure by Letters Patent—

1. In a combined seed-planter and cultivator, the combination, with the frame A, carrying the plow or shovel standards B, and the roller N, with the seed-dropper-operating belt passed around a pulley on its axis, of the bars O, having the straight and curved slots $O' O^2$, through which pass adjusting and holding screws P Q, substantially as and for the purpose set forth.

2. The combined seed-planter and cultivator, consisting of the frames A, provided with the roller N, connected thereto by the bars O, having the slots $O' O^2$, through which pass holding and adjusting screws P Q, the plow or shovel standard B, the coverer R, following the roller N, the seed-hopper F, provided with the dropper I, having its axis connected to that of the roller N by the belt L, and the spout H, extending through the bottom of the seed-hopper and one of the plow-standards, as set forth.

J. J. BIRDSONG.

Witnesses:
T. J. CARSON,
C. M. MERWIN.